March 13, 1956   J. R. VERNON   2,738,082
PIPE SUPPORTING APPARATUS
Filed April 27, 1953

INVENTOR.
J. R. Vernon
BY
C. McKnight
ATTORNEY

United States Patent Office 2,738,082
Patented Mar. 13, 1956

2,738,082

PIPE SUPPORTING APPARATUS

James R. Vernon, Tuscola, Ill.

Application April 27, 1953, Serial No. 351,253

3 Claims. (Cl. 214—1)

This invention relates generally to a support for aligning cylindrical members, and more particularly, but not by way of limitation, to a pipe dolly for use in accurately aligning and spacing sections, or lengths of pipe in order that the pipe may be conveniently fabricated by welding and the like.

In normal operation, pipe dollies are mounted on frames and are spaced longitudinally in order to support a suitable section of pipe thereunder. Of course, when it is desired to fabricate the ends of one or more sections of the pipe, one or more pipe supports are utilized to place the pipe sections in rough alignment with each other. The conventional pipe dolly is usually provided with adjusting rollers or the like for making a more accurate alignment of the pipe during the supporting operation in order than an efficient welding or fabricating may be accomplished.

The present invention is mainly concerned with an apparatus or system of supporting a section or sections of pipe for fabrication and the like wherein there may not only be an accurate alignment of ends of the pipe sections, but the dolly may act as a jack for moving the supported pipe in a vertical direction without the necessity of picking the pipe up to accomplish this vertical upward movement.

It is an important object of this invention to provide a pipe support apparatus which will support and rotate sections of pipe for bringing them into proper alignment or into a position to be fabricated.

Another object of this invention is to provide an apparatus which is adapted to accommodate work pieces of varying lengths and diameters which may be joined together in end to end relation.

Still another object of this invention is to provide a pipe dolly adapted to accommodate pipe sections of various lengths and diameters for fabrication of the pipe where the pipe dolly may be actuated to cause vertical movement of supported pipe sections without removal of the pipe sections from the dolly.

And still a further object of this invention is to provide a pipe dolly for supporting cylindrical units having circular supporting means disposed ninety degrees apart and movable transversely relative to each other in order to properly align the pipe as desired.

Other objects and advantages of the invention will be evident from the following detailed description, read in conjunction with the accompanying drawings, which illustrate my invention.

Figure 1:
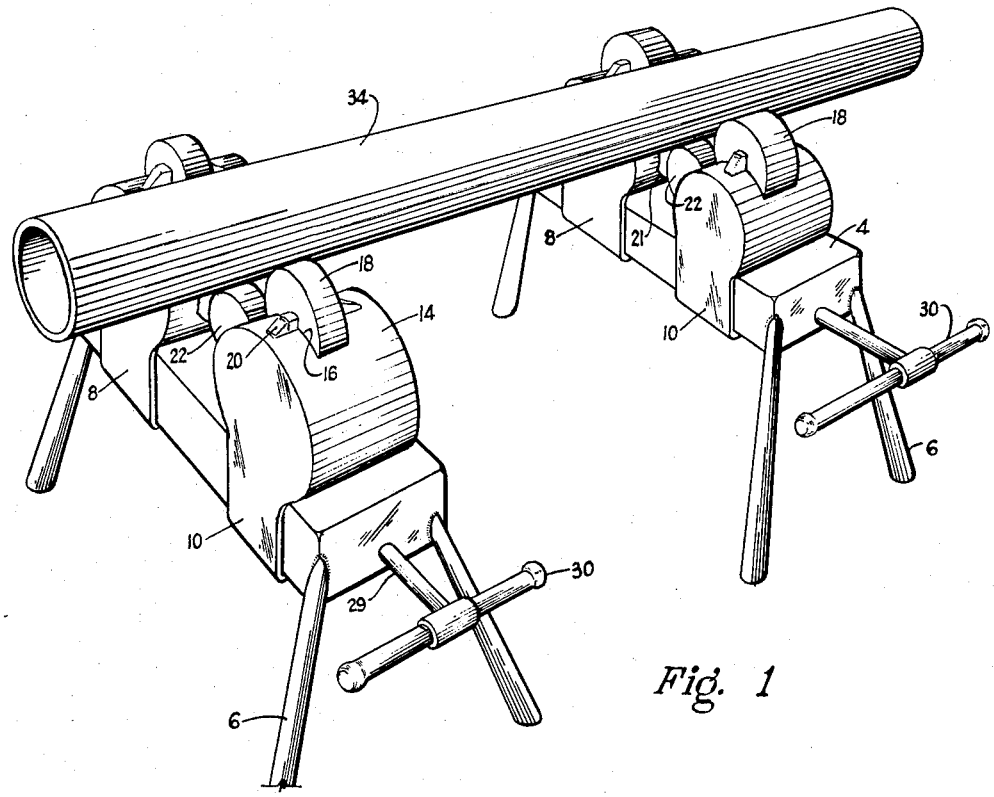
Figure 1 is a perspective view showing a pair of pipe dollies supporting a section of pipe.
Figure 2:
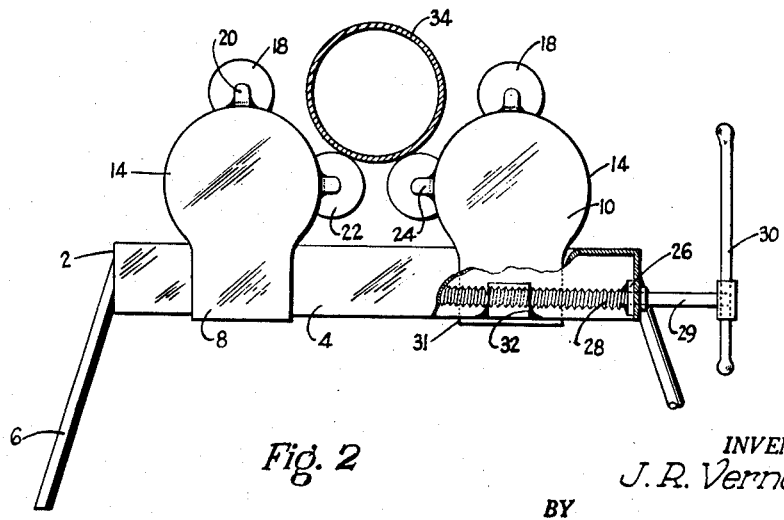
Figure 2 is an end elevational view of one of the pipe supports with certain parts cut away for clarity.

Referring to the drawing in detail, the pipe support or dolly 2 comprises a frame or bed member 4 adapted to be supported by suitable leg members 6 preferably located at each corner thereof, as is clearly shown in Figs. 1 and 2. The bed member 4 is preferably of substantially rectangular configuration, and is adapted to support a pair of freely slidable pipe supporting members 8 and 10 respectively. Each of the members 8 and 10 is provided with a strap-like portion 12 surrounding the frame 4 in order to be maintained thereon. The upper portion 14 of the members 8 and 10 is formed of a substantially circular shape. A grooved or recessed portion 16 is provided in the extreme uppermost portion of the cylindrical portions 14 of each member 8 and 10 for the reception of part of a freely rotatable roller member 18 secured thereto by bearings 20 in any suitable manner. Each cylindrical portion 14 of the supporting members 8 and 10 is provided with upper rollers 18. The inwardly disposed circumference of each circular portion 18 is likewise provided with a similar slot 21 for the reception of part of a roller member 22 for each of the members 8 and 10. These roller members are secured in freely rotatable disposition by bearings 24 and are disposed at right angles, or substantially ninety degrees, to the roller members 18.

Each end of the bed member 4 is provided with a bearing 26, only one of which is shown, for supporting a screw shaft 28 having an extension 29 and a handle 30 depending outwardly from the one end of the bed 4 (Fig. 2). The screw shaft 28 is freely rotatable upon manipulation of the handle 30. The bottom strap portions 31 of each of the pipe support members 8 and 10 is provided with an upstanding flange member 32, only one of which is shown in Fig. 2, adapted to be in threaded engagement with the shaft 28 in order to provide transverse movement of the members 8 and 10 upon rotation of the screw shaft 28. It will thus be seen that rotation of the shaft 28 in one direction will cause movement of the members 8 and 10 and their respective rollers 18 and 22 in a transverse direction inwardly toward each other. While a reverse rotation from the first mentioned rotation, the members 8 and 10 will be caused to be moved in a transverse direction away from each other.

Operation

As clearly shown in Fig. 1, the pipe supports are adapted to be arranged in longitudinal spaced relation for supporting a suitable section of pipe 34 or the like for manipulation and handling. It will be apparent that if more than one section of pipe 34 is to be worked upon, such as when two sections are desired to be fabricated in end to end relation by welding or the like, then a plurality of the pipe dollies or supports 2 may be utilized accordingly. The pair of transversely movable circular members 8 and 10 are adapted to move the pipe upwardly or downwardly in accordance with a rotation of the screw shaft 28 by the handle 30. Furthermore, the pipe supports are adapted for variable sized pipe whereupon the rollers 22 may be utilized to support smaller diameter pipe, whereas the rollers 18 may support larger diameter pipe. However, it will be apparent that the movement inwardly or outwardly of the support members will raise or lower the pipe accordingly. The radius of curvature of the roller members 18 and 22, as well as the outer periphery of the supports 14, will provide for raising or lowering pipe in accordance with the size of pipe being fabricated. In the fabrication, if one end of a pipe resting or supported on a particular dolly is lower than the opposite end also supported by a similar dolly, the lower end may be raised by adjustment of the support members 14, or in the alternative, the higher end may be lowered by adjustment of the support members 14 of its particular dolly. This raising and lowering of smaller sized pipe members is accomplished by the lower rollers 22, while the upper rollers 18 are utilized for larger sized pipe members. It will thus be apparent that the pipe dollies can be used for all size pipes, including the larger size approximately thirty-six inches.

From the foregoing, it will be apparent that the present invention contemplates an apparatus which may be used for alignment, handling and fabrication respecting all types of cylindrical bodies, such as pipe and the like, and includes handling pipe of different sizes. Furthermore, the inward movement of the circular units on the dolly act as a jack to cause a simultaneous vertical movement of the pipe resting on the supporting rollers without necessarily picking the pipe up by extraneous apparatus.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a fabricating dolly for supporting one portion of elongated pipe sections in end to end relationship, said dolly comprising a bed, a pair of support members slidable on the bed, means for moving the slidable members in transverse relationship to each other, each of the slidable members having a circular portion, freely rotatable rollers mounted on each of the circular portions and in right angled relation to each other, whereby variable sizes of pipe may be handled by the slidable members.

2. In a pipe fabricating apparatus for supporting a pair of elongated pipe sections in end to end relationship comprising in combination a plurality of pipe dollies, each dolly having a bed, transversely movable support members carried by the bed and adapted for supporting the pipe in a normal horizontal position, manually operated screw means for moving the support members toward and away from each other, each of the support members having substantially circular configuration, a pair of grooves in each of the support members and disposed in right angled relation to each other, a freely rotatable roller mounted in each of the grooves providing supporting rollers at variable radius of curvature on the support members, whereby variable sized pipe may be handled by the support member.

3. In a pipe fabricating apparatus for supporting a pair of elongated pipe sections in end to end relationship comprising in combination a plurality of pipe dollies, each dolly having a bed, transversely movable support members carried by the bed and adapted for supporting the pipe in a normal horizontal position, manually operated screw means for moving the support members toward and away from each other, each of the support members having a portion of substantially circular configuration, a pair of grooves in each of the support members and disposed in right angled relation to each other, a freely rotatable roller mounted in each of the grooves providing supporting rollers interposed with a variable radius of curvature on the support members, said circular configuration of the support members cooperating with the roller members upon transverse movement of the support members to change the vertical position of the supported pipe sections.

References Cited in the file of this patent

UNITED STATES PATENTS

| | | |
|---|---|---|
| 613,598 | Pearson | Nov. 1, 1898 |
| 1,891,995 | Marcy | Dec. 27, 1932 |
| 2,287,085 | Caldwell | June 23, 1942 |